US012412534B2

(12) United States Patent
Yoon

(10) Patent No.: US 12,412,534 B2
(45) Date of Patent: Sep. 9, 2025

(54) DISPLAY APPARATUS

(71) Applicant: LG Display Co., Ltd., Seoul (KR)

(72) Inventor: Dong-Ki Yoon, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/537,569

(22) Filed: Dec. 12, 2023

(65) Prior Publication Data

US 2024/0257768 A1 Aug. 1, 2024

(30) Foreign Application Priority Data

Jan. 30, 2023 (KR) ........................ 10-2023-0011905

(51) Int. Cl.

*G09G 3/30* (2006.01)
*G09G 3/3266* (2016.01)
*G09G 3/36* (2006.01)

(52) U.S. Cl.

CPC ......... *G09G 3/3266* (2013.01); *G09G 3/3677* (2013.01); *G09G 2300/0861* (2013.01); *G09G 2310/0289* (2013.01)

(58) Field of Classification Search

CPC ............... G09G 3/3266; G09G 3/3677; G09G 2300/0426; G09G 2300/0861; G09G 2310/0267; G09G 2310/0289
See application file for complete search history.

(56) References Cited

U.S. PATENT DOCUMENTS

| | | | | |
|---|---|---|---|---|
| 9,786,243 B2 * | 10/2017 | Cho | G09G 3/3696 |
| 11,263,942 B2 * | 3/2022 | Feng | G11C 19/287 |
| 11,322,068 B2 * | 5/2022 | Hong | G09G 3/2092 |
| 11,443,674 B2 * | 9/2022 | Hong | G11C 19/28 |
| 2015/0029082 A1 * | 1/2015 | Jeon | G09G 3/3677 377/64 |
| 2018/0130435 A1 * | 5/2018 | Lee | G09G 3/3677 |
| 2019/0206502 A1 * | 7/2019 | Lim | G09G 3/20 |
| 2020/0043404 A1 * | 2/2020 | Yu | G09G 3/3266 |
| 2022/0335900 A1 * | 10/2022 | Feng | G11C 19/28 |
| 2023/0139398 A1 * | 5/2023 | Kim | G09G 3/3233 345/214 |
| 2024/0071314 A1 * | 2/2024 | Keum | G09G 3/3266 |
| 2024/0194148 A1 * | 6/2024 | In | G09G 3/3233 |

* cited by examiner

*Primary Examiner* — Joe H Cheng
(74) *Attorney, Agent, or Firm* — Seed Intellectual Property Law Group LLP

(57) ABSTRACT

A display apparatus includes a display panel including a pixel and a gate line connected to the pixel. The apparatus includes a gate driving circuit including a stage that outputs a gate signal to the gate line. The stage includes a first pull-up transistor and a first pull-down transistor that are connected to each other with a first output terminal, which outputs the gate signal, therebetween. The stage includes a Q node and a Qb node that are respectively connected to the first pull-up transistor and the first pull-down transistor. The stage includes a 3*a* transistor and a 3*b* transistor which are located in a discharge path of the Q node and are connected in series with each other with a Qc node therebetween, and whose gate electrodes are connected to the Qb node. The stage includes a charging capacitor connected to the Qc node.

20 Claims, 7 Drawing Sheets

DISPLAY APPARATUS

CROSS-REFERENCE TO RELATED APPLICATIONS

The present application claims the priority benefit of Korean Patent Application No. 10-2023-0011905 filed in Republic of Korea on Jan. 30, 2023, which is hereby incorporated by reference in its entirety for all purposes as if fully set forth herein.

BACKGROUND

Technical Field

The present disclosure relates to a display apparatus.

Description of the Related Art

As the information society develops, demand for display apparatuses for displaying images has increased in various forms, and recently, various flat display apparatuses such as organic light emitting display apparatus and liquid crystal display apparatus have been used.

For these flat panel display apparatuses, a GIP (gate-in panel) type, in which a gate driving circuit is formed directly on a substrate, has been applied in recent years. The gate driving circuit includes stages that outputs gate signals to respective gate lines, and a plurality of transistors are disposed in the stage.

To a Q node which a control terminal of a pull-up transistor that controls output of the gate signal is connected, a transistor that discharges a voltage of the Q node is connected.

BRIEF SUMMARY

A transistor in a gate driving circuit is continuously subjected to a high voltage drain stress (HVDS) as a boosted high voltage of the Q node is repeatedly applied between source and drain electrodes of the transistor, so that the transistor may deteriorate and its characteristics may deteriorate. Moreover, a threshold voltage of the transistor discharging the voltage of the Q node is negatively shifted due to deviation or deterioration of manufacturing processes, and in this case, the voltage of the Q node may not be sufficiently maintained and may drop. Accordingly, a problem in which the gate driving circuit becomes defective may occur.

Various embodiments of the present disclosure is directed to a display apparatus that substantially obviates one or more of the problems due to limitations and disadvantages of the related art including the technical problem identified above.

An advantage of the present disclosure is to provide a display apparatus which can improve a HVDS of a transistor that discharges a voltage of a Q node in a gate driving circuit and improve a voltage drop of a Q node when a threshold voltage is negatively shifted.

Additional features and advantages of the disclosure will be set forth in the description which follows, and in part will be apparent from the description, or may be learned by practice of the disclosure. These and other advantages of the disclosure will be realized and attained by the structure particularly pointed out in the written description and claims hereof as well as the appended drawings.

To achieve these and other advantages and in accordance with the purpose of the present disclosure, as embodied and broadly described herein, a display apparatus includes: a display panel including a pixel and a gate line connected to the pixel; and a gate driving circuit including a stage that outputs a gate signal to the gate line, wherein the stage includes: a first pull-up transistor and a first pull-down transistor that are connected to each other with a first output terminal, which outputs the gate signal, therebetween; a Q node and a Qb node that are respectively connected to the first pull-up transistor and the first pull-down transistor; a 3*a* transistor and a 3*b* transistor which are located in a discharge path of the Q node and are connected in series with each other with a Qc node therebetween, and whose gate electrodes are connected to the Qb node; and a charging capacitor connected to the Qc node.

In another aspect, a display apparatus includes: a display panel including a scan line; and a stage that outputs a scan signal to the scan line, wherein the stage includes: a first pull-up transistor and a first pull-down transistor that output the scan signal; a Q node and a Qb node that are respectively connected to the first pull-up transistor and the first pull-down transistor; a 3*a* transistor and a 3*b* transistor which are connected in series with each other with a Qc node therebetween, and whose gate electrodes are connected to the Qb node; and a charging capacitor connected to the Qc node, wherein a drain electrode of the 3*a* transistor is connected to the Q node, and a source electrode of the 3*b* transistor receives a second power voltage.

It is to be understood that both the foregoing general description and the following detailed description are exemplary and explanatory and are intended to provide further explanation of the disclosure as claimed.

BRIEF DESCRIPTION OF THE SEVERAL VIEWS OF THE DRAWINGS

The accompanying drawings, which are included to provide a further understanding of the disclosure and are incorporated in and constitute a part of this specification, illustrate embodiments of the disclosure and together with the description serve to explain the principles of the disclosure. In the drawings.

DETAILED DESCRIPTION

Figure 1:
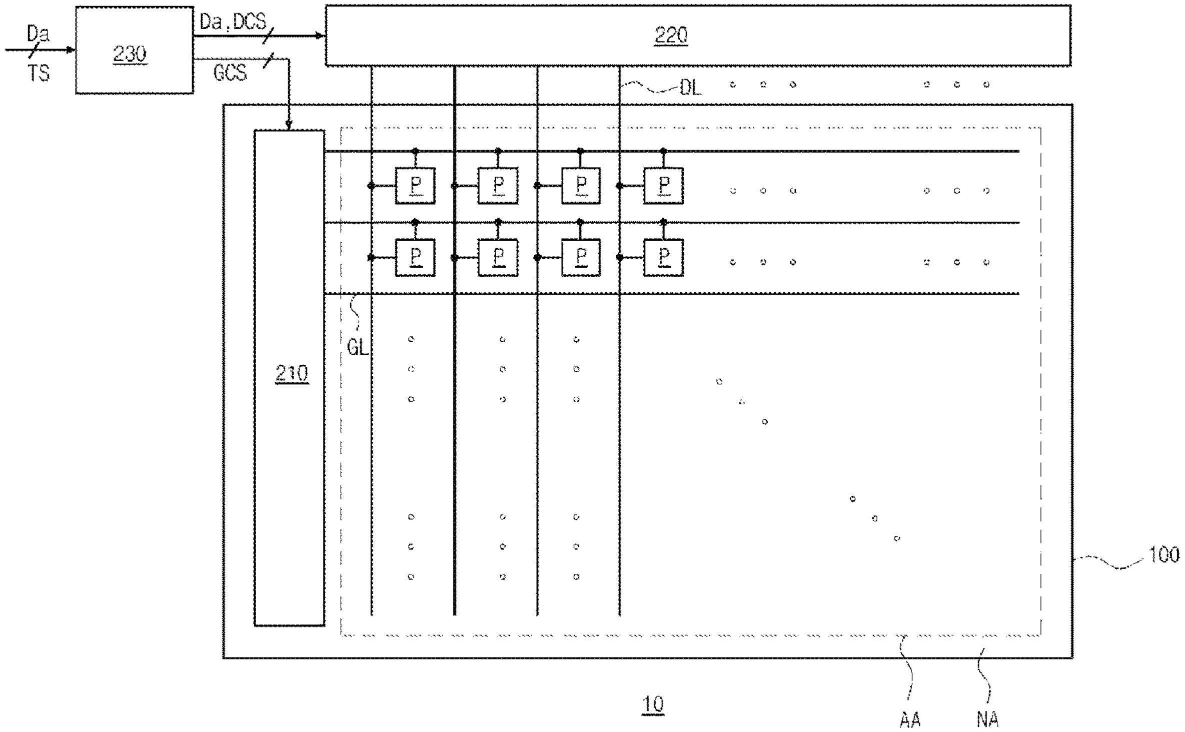
FIG. 1 is a view schematically illustrating a display apparatus according to an embodiment of the present disclosure.

Advantages and features of the present disclosure and methods of achieving them will be apparent with reference to the embodiments described below in detail with the accompanying drawings. However, the present disclosure is not limited to the embodiments disclosed below, but can be realized in a variety of different forms, and only these embodiments allow the present disclosure to be complete. The present disclosure is provided to fully inform the scope of the disclosure to the skilled in the art of the present disclosure.

The shapes, sizes, proportions, angles, numbers, and the like disclosed in the drawings for explaining the embodiments of the present disclosure are illustrative, and the present disclosure is not limited to the illustrated matters. The same reference numerals refer to the same components throughout the description.

Furthermore, in describing the present disclosure, if it is determined that a detailed description of the related known technology unnecessarily obscure the subject matter of the present disclosure, the detailed description thereof can be omitted. When 'comprising', 'including', 'having', 'consisting', and the like are used in this disclosure, other parts can be added unless 'only' is used. When a component is expressed in the singular, cases including the plural are included unless specific statement is described.

In interpreting the components, even if there is no separate explicit description, it is interpreted as including a margin range.

In the case of a description of a positional relationship, for example, when the positional relationship of two parts is described as 'on', 'over', 'above', 'below', 'beside', 'under', and the like, one or more other parts can be positioned between such two parts unless 'right' or 'directly' is used.

In the case of a description of a temporal relationship, for example, when a temporal precedence is described as 'after', 'following', 'before', and the like, cases that are not continuous can be included unless 'directly' or 'immediately' is used.

In describing components of the present disclosure, terms such as first, second and the like can be used. These terms are only for distinguishing the components from other components, and an essence, order, order, or number of the components is not limited by the terms. Further, when it is described that a component is "connected", "coupled" or "contact" to another component, the component can be directly connected or contact the another component, but it should be understood that other component can be "interposed" between the components.

Respective features of various embodiments of the present disclosure can be partially or wholly connected to or combined with each other and can be technically interlocked and driven variously, and respective embodiments can be independently implemented from each other or can be implemented together with a related relationship.

Hereinafter, embodiments of the present disclosure are described in detail with reference to the drawings. Meanwhile, in the following embodiments, the same and like reference numerals are assigned to the same and like components, and detailed descriptions thereof may be omitted.

Figure 2:
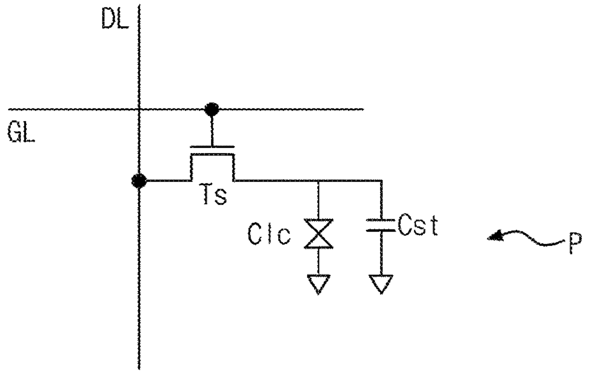
FIGS. 2 and 3 are circuit diagrams schematically illustrating examples of pixels according to an embodiment of the present disclosure.
Figure 3:
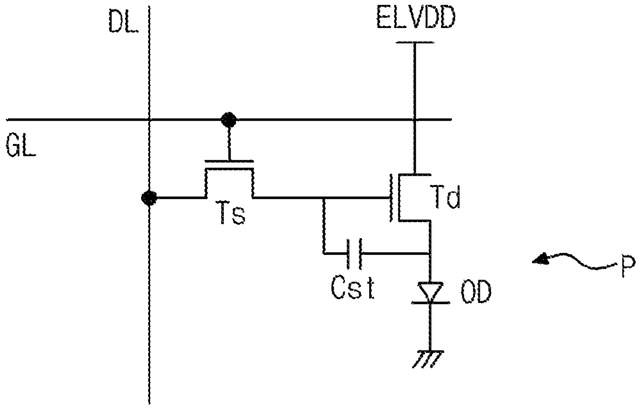
Figure 4:
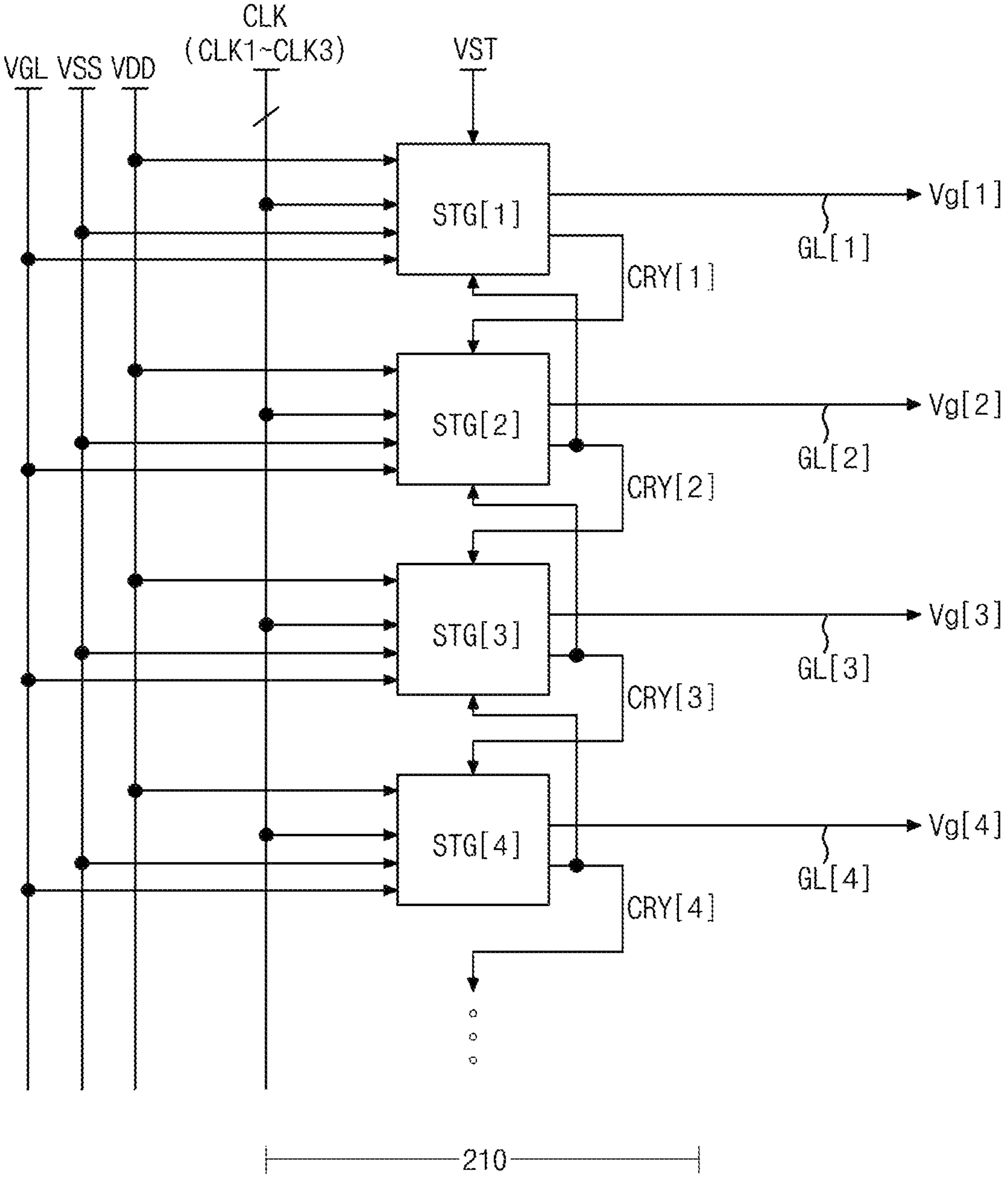
FIG. 4 is a diagram schematically illustrating a configuration of a GIP type gate driving circuit of a display apparatus according to an embodiment of the present disclosure.

FIG. 1 is a view schematically illustrating a display apparatus according to an embodiment of the present disclosure. FIGS. 2 and 3 are circuit diagrams schematically illustrating examples of pixels according to an embodiment of the present disclosure. FIG. 4 is a diagram schematically illustrating a configuration of a GIP type gate driving circuit of a display apparatus according to an embodiment of the present disclosure.

Prior to a detailed description, the display apparatus 10 of this embodiment may include all types of display apparatuses to which the GIP type gate driving circuit 210 is applied, including an organic light emitting display apparatus and a liquid crystal display apparatus.

Referring to FIG. 1, the display apparatus 10 of this embodiment may include a display panel 100 and a driving circuit unit that drives the display panel 100.

Here, the driving circuit may include, for example, a gate driving circuit 210, a data driving circuit 220, and a timing control circuit 230.

The display panel 100 may include a display region AA where a plurality of pixels P displaying an image are arranged, and a non-display region NA around the display region AA.

In the display region AA of the display panel 100, the plurality of pixels P may be arranged in a matrix form along a plurality of row lines (or horizontal lines) and a plurality of column lines (or vertical lines) on a substrate.

An image can be displayed on a screen of the display panel 100 through light output from the plurality of pixels P.

The plurality of pixels P may include pixels P displaying different colors, for example, red, green, and blue pixels displaying red, green, and blue, respectively, but not limited thereto.

In the display panel 100, various signal lines that transmit driving signals for driving the pixels P may be formed on the substrate.

In this regard, for example, a plurality of data lines DL transmitting data signals (or data voltages), which are image signals, may extend along the column direction (or vertical direction) and be connected to the pixels P of the corresponding column lines.

In addition, a plurality of gate lines (or scan lines) GL transmitting gate signals (or gate voltages) may extend along the horizontal direction and be connected to the pixels P of the corresponding row lines.

Meanwhile, depending on the type of the display panel 100, the display panel 100 may be provided with other signal line in addition to the data line DL and the gate line GL.

The pixels P may be defined by the plurality of data lines DL and gate lines GL that cross each other.

Meanwhile, the display panel 100 of this embodiment may be, for example, a liquid crystal display panel in which a liquid crystal element is provided in the pixel P, or a light emitting display panel in which a light emitting diode as a light emitting element is provided in a pixel P.

In this regard, when the display panel 100 is a liquid crystal display panel, the pixel P may be configured as shown in FIG. 2.

For example, the pixel P may be provided with a switching transistor Ts and a liquid crystal capacitor Clc.

The switching transistor Ts may provide a data signal supplied through the data line DL to the liquid crystal capacitor Clc in response to the gate signal supplied through the gate line GL. A gate electrode, a drain electrode, and a source electrode of the switching transistor Ts may be connected to the gate line GL, the data line DL, and a pixel electrode of the liquid crystal capacitor Clc, respectively. The liquid crystal capacitor Clc may include a pixel electrode and a common electrode corresponding to each other, and a liquid crystal layer interposed between the pixel electrode and the common electrode.

The pixel P may further include a storage capacitor Cst to store the input data signal.

Meanwhile, when the display panel 100 is a light emitting display panel, the pixel P may be configured as shown in FIG. 3.

For example, the pixel P may be provided with a switching transistor Ts, a driving transistor Td, a storage capacitor Cst, and a light emitting diode OD. In some cases, transistor and capacitor of different type (or function) may be additionally provided.

The switching transistor Ts may provide a data signal supplied through the data line DL to the driving transistor Td in response to the gate signal supplied through the gate line GL. A gate electrode, a drain electrode, and a source electrode of the switching transistor Ts may be connected to the gate line GL, the data line DL, and a gate electrode of the driving transistor Td, respectively.

The driving transistor Td may provide a high potential driving voltage ELVDD supplied through a power line to the light emitting diode OD according to the data signal applied to the gate electrode through the switching transistor Ts.

The drain electrode of the driving transistor Td may be applied with a high potential driving voltage ELVDD, and the source electrode of the driving transistor Td may be connected to the light emitting diode OD.

The storage capacitor Cst may be connected between the gate electrode and the source electrode of the driving transistor Td, and may maintain a voltage of the gate electrode of the driving transistor Td.

Meanwhile, the transistor Ts provided in the pixel P in FIG. 2 or the transistors Ts and Td provided in the pixel P in FIG. 3 may use a semiconductor layers, for example, one of an oxide semiconductor layer, a crystalline silicon layer, and an amorphous silicon layer.

Here, the oxide semiconductor has excellent off-current characteristics and may be used as a semiconductor layer of the switching transistor Ts of FIG. 2 or 3. The crystalline silicon has excellent mobility and may be used as a semiconductor layer of the driving transistor DT of FIG. 3.

Referring again to FIG. 1, the gate driving circuit 210 may receive a gate control signal GCS from the timing control circuit 230, generate the gate signals, and sequentially transmit the gate signals to the plurality of gate lines GL. For example, the gate signals may be sequentially output along the column direction from top to bottom in the drawing.

The gate driving circuit 210 may be formed directly on the substrate of the display panel 100 to be configured in a GIP (gate-in panel) structure. For example, in the processes of forming elements of the display panel 100, the gate driving circuit 210 may be formed.

The gate driving circuit 210 having the GIP structure may be formed, for example, in the non-display area NA of the substrate of the display panel 100.

The data driving circuit 220 may receive image data Da and a data control signal DCS from the timing control circuit 230, convert the image data Da into data voltages as analog image data in response to the data control signal DCS, and output the data voltages to the corresponding data line DL for each row line.

Although not specifically shown, the data driving circuit 220 may be configured to include at least one data IC. In this case, the data IC of the data driving circuit 230 may be mounted on a flexible circuit film and be connected to the non-display region NA on a corresponding side of the display panel 100, or may be mounted directly on the non-display region NA.

The timing control circuit 230 may receive the image data Da and various timing signals TS from an external host system through an interface such as a Low Voltage Differential Signaling (LVDS) interface, or a Transition Minimized Differential Signaling (TMDS) interface. Using the timing signal TS, the timing control circuit 230 may generate and output the data control signal DCS and the gate control signal GCS to the data driving circuit 220 and the gate driving unit 210, respectively.

Hereinafter, a configuration of the gate driving circuit 210 of this embodiment is described in more detail.

FIG. 4 is a block diagram schematically illustrating an example of a configuration of a gate driving circuit according to an embodiment of the present disclosure.

Referring to FIG. 4, the gate driving circuit 210 of this embodiment may be, for example, a plurality of stages STG that are dependently connected to each other and sequentially generate the gate signals Vg which are scan signals of a plurality of row lines. In FIG. 4, for convenience of explanation, the stages STG[1], STG[2], STG[3] and STG [4] corresponding to some row lines (i.e., first, second, third, and fourth row lines) are shown.

Each stage STG may include a plurality of transistors and at least one capacitor, and output the gate signal Vg to the gate line GL on the corresponding row line.

Each stage STG may receive, for example, an output signal of the previous stage STG as a carry signal CRY, and use it as a start signal (or set signal). Meanwhile, the stage STG[1] of the first row line may receive a separate start signal VST.

In addition, for example, each stage (STG) may receive the carry signal CRY output from the subsequent stage STG and use it as a reset signal.

Moreover, each stage STG may receive a corresponding clock signal CLK. In this embodiment, for convenience of explanation, an example is taken where first to third clock signals CLK1 to CLK3, which are three-phase clock signals CLK different in phase from each other, are alternately applied to the corresponding stages STG.

Moreover, each stage STG may receive a plurality of power voltages VDD, VSS and VGL from a power supply source. For example, each stage STG may be provided with a high potential power voltage (or first power voltage) VDD, a low potential power voltage (or second power voltage) VSS, and a gate low voltage VGL.

The stage STG may output the corresponding clock signal (CLK) as the gate signal Vg of a turn-on voltage during a horizontal period of the corresponding row line. For example, the first stage STG[1] may switch its pull-up transistor to which the corresponding first clock signal CLK1 is applied to output the first clock signal CLK1 as the gate signal Vg[1], and the second stage STG [2] may switch its pull-up transistor to which the corresponding second clock signal CLK2 is applied to output the second clock signal CLK2 as the gate signal Vg[2].

After the horizontal period, the stage STG may output a turn-off voltage, for example, the gate low voltage VGL as the gate signal Vg through its pull-down transistor to which the gate low voltage VGL is applied.

Figure 5A:
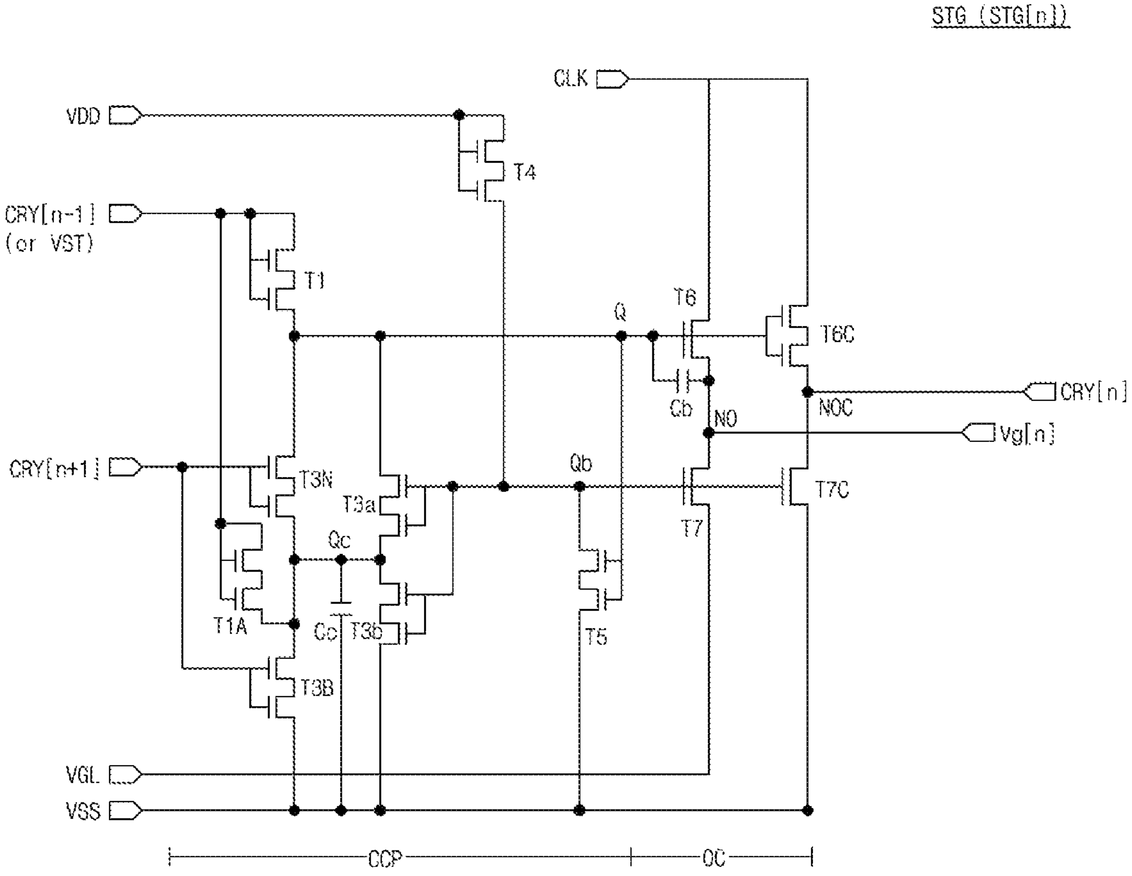
FIG. 5A is a view schematically illustrating a first example of a configuration of a stage of a gate driving circuit according to an embodiment of the present disclosure.
Figure 5B:
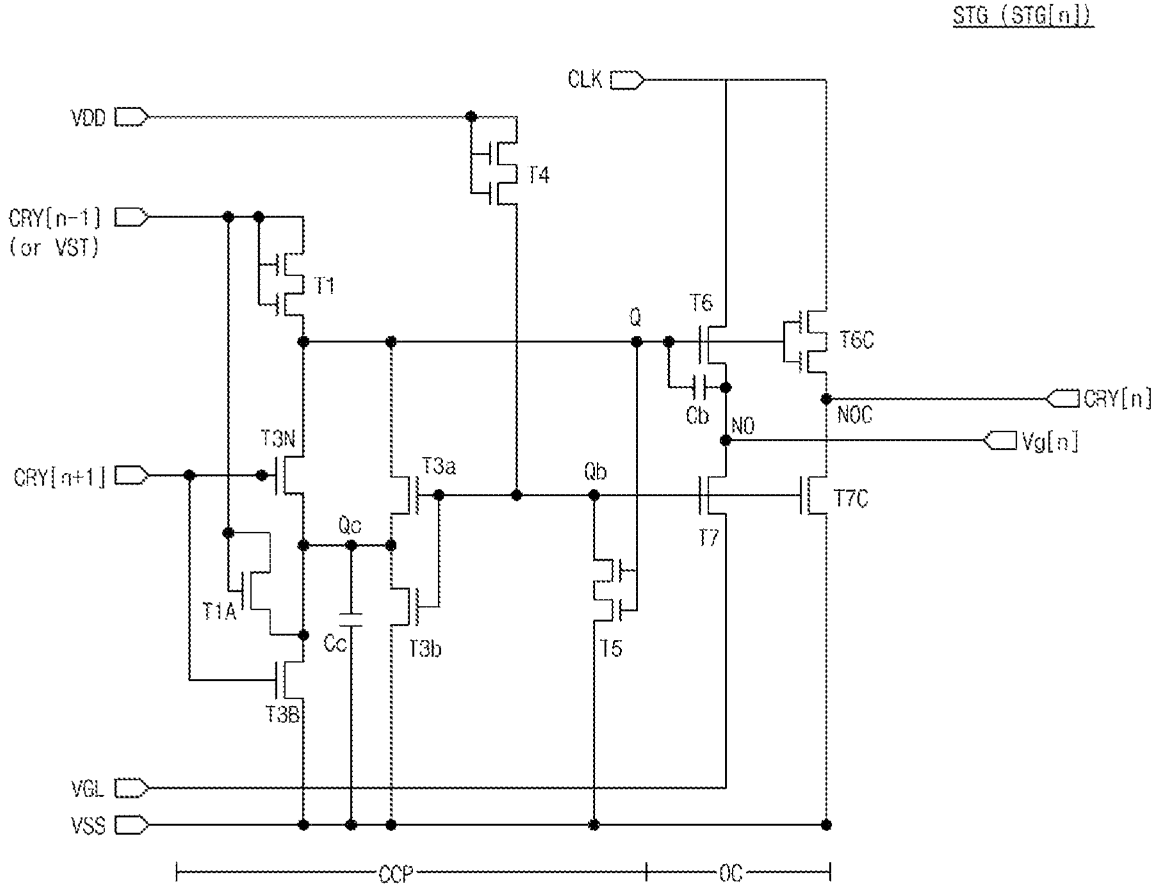
FIG. 5B is a view schematically illustrating a second example of a configuration of a stage of a gate driving circuit according to an embodiment of the present disclosure.

The detailed configuration of the stage STG operating in the above manner is described with further reference to FIGS. 5A and 5B.

FIG. 5A is a view schematically illustrating a first example of a configuration of a stage of a gate driving circuit according to an embodiment of the present disclosure, and FIG. 5B is a view schematically illustrating a second example of a configuration of a stage of a gate driving circuit according to an embodiment of the present disclosure.

FIG. 5A shows an example where T3 series transistors T3N, T3B, T3*a* and T3*b* of the stage STG are configured in a double-length structure. FIG. 5B shows an example where T3 series transistors T3N, T3B, T3*a* and T3*b* of the stage STG are configured in a single-length structure.

Meanwhile, in FIGS. 5A and 5B, for convenience of explanation, a n-th stage STG[n] connected to the gate line GL of a n-th row line is shown as an example.

Referring to FIGS. 5A and 5B along with FIGS. 1 and 4, the stage STG of the gate driving circuit 210 may include an output circuit portion OC that outputs the gate signal Vg, and a control circuit portion CCP that controls an output operation of the output circuit portion OC.

A plurality of transistors and capacitors provided in the output circuit portion OC and the control circuit portion CCP of the stage STG may be formed in processes of forming array elements in the display panel P. Accordingly, the transistors provided in the stage STG may be formed in the same processes as the transistor (e.g., Ts of FIG. 2, Ts and Td of FIG. 3) in the pixel P, and may include a semiconductor layer such as oxide semiconductor, crystalline silicon, or amorphous silicon.

The output circuit portion OC may include, for example, a first pull-up transistor T6 and a first pull-down transistor T7 as a pull-up transistor and a pull-down transistor (or a Q transistor and a Qb transistor) that performs the function of outputting the gate signal Vg to the corresponding gate line GL.

Here, the first pull-up transistor T6 may output the turn-on voltage of the gate signal Vg, for example, a high voltage.

In this regard, for example, a gate electrode, which is a control electrode of the first pull-up transistor T6, may be connected to a Q node of the control circuit portion CCP. A drain electrode (or source electrode) (or first electrode) of the first pull-up transistor T6 may receive the corresponding clock signal CLK. A source electrode (or drain electrode) (or second electrode) of the first pull-up transistor T6 may be connected to a first output node NO which is an output terminal of the gate signal Vg. Meanwhile, in this embodiment, the terms, "source electrode" and "drain electrode" of each transistor provided in the stage STG indicate two electrodes which a signal passing through the transistor are input to and output from, and it should be understood that if one of the two electrodes is called a source electrode, the other is called a drain electrode.

Meanwhile, a boost capacitor Cb may be connected between the gate electrode of the first pull-up transistor T6 and the first output node NO and may serve to store and boost the voltage of the gate electrode, i.e., the voltage of the Q node.

The first pull-down transistor T7 may output the turn-off voltage of the gate signal Vg, for example, a low voltage.

A gate electrode, which is a control electrode of the first pull-down transistor T7, may be connected to a Qb node of the control circuit portion CCP. A drain electrode of the first pull-down transistor T7 may be connected to the first output node NO. A source electrode of the first pull-down transistor T7 may receive the gate low voltage VGL.

The first pull-up transistor T6 and the first pull-down transistor T7 may conduct on/off switching opposite to each other. Accordingly, the stage STG may output the gate signal Vg of the high voltage to the gate line GL connected to it during the horizontal period (or current horizontal period) of the corresponding row line, and then may output the gate signal Vg of the low voltage (i.e., the gate low voltage VGL) to the gate line GL until the horizontal period of the next frame.

Meanwhile, the output circuit portion OC of the stage STG may include a second pull-up transistor T6C and a second pull-down transistor T7C as transistors that output the carry signal CRY which is output at substantially the same timing (or waveform) as the gate signal Vg.

Here, the second pull-up transistor T6 may output a turn-on voltage of the carry signal CRY, for example, a high voltage.

The second pull-up transistor T6C may have a connection structure similar to the first pull-up transistor T6. For example, a gate electrode, which is a control electrode of the second pull-up transistor T6C, may be connected to the Q node of the control circuit portion CCP. A drain electrode of the second pull-up transistor T6C may receive the corresponding clock signal CLK. A source electrode of the second pull-up transistor T6C may be connected to a second output node NOC which is an output terminal of the carry signal CRY.

The second pull-down transistor T7C may output a turn-off voltage of the carry signal CRY, for example, a low voltage.

The second pull-down transistor T7C may have a connection structure similar to the first pull-down transistor T7. For example, a gate electrode, which is a control electrode of a second pull-down transistor T7C, may be connected to the Qb node of the control circuit portion CCP. A drain electrode of the second pull-down transistor T7C may be connected to the second output node NOC. A source electrode of the second pull-down transistor T7C may be connected to the low potential power voltage VSS.

The second pull-up transistor T6C and the second pull-down transistor T7C may conduct on/off switching opposite to each other. Accordingly, the stage STG may output the carry signal CRY at substantially the same timing as the gate signal Vg.

For example, the carry signal CRY may be applied to the next stage (e.g., STG[n+1], also referred to a subsequent stage) and be used as a start signal (or set signal) of the next stage, and may also be applied to the previous stage (e.g., STG[n−1]) and be used as a reset signal of the previous stage.

Meanwhile, as another example, it may be configured that the gate signal Vg is used as the carry signal CRY, and in this case, the second pull-up transistor T6C and the second pull-down transistor T7C can be omitted.

The control circuit portion CCP may include a plurality of transistors T1, T1A, T3N, T3B, T3*a*, T3*b*, T4, and T5 to control (or charge and discharge) voltages at the Q node and Qb node.

Moreover, in the control circuit portion CCP, in order to relieve the HVDS of the transistors, which are connected to the Q node and have the function of discharging (or resetting) the voltage of the Q node, for example, the T3 series transistors T3*a*, T3*b*, T3N, and T3B, and to relieve the voltage drop of the Q node when the threshold voltage of the transistors is negatively shifted, a Qc node may be set within a discharge path of the Q node and a charging capacitor Cc may be connected to the Qc node.

The control circuit portion CCP is described below in more detail.

The control circuit portion CCP may include, for example, eight transistors T1, T1A, T3N, T3B, T3*a*, T3*b*, T4, and T5.

The first transistor T1 may be connected to the Q node and be switched to charge the Q node to the turn-on voltage.

In this regard, for example, gate electrode and drain electrode of the first transistor T1 may be connected to each other and receive the carry signal CRY[n−1] of the previous stage. A source electrode of the first transistor T1 may be connected to the Q node.

The first transistor T1 connected in this way may be turned on during a time when the previous carry signal CRY[n−1] has the turn-on voltage (i.e., a horizontal period of the previous row line (or previous horizontal period)), so that the turn-on voltage may be applied and charged to the Q node.

Meanwhile, when the turn-on voltage is applied to the Q node by the previous carry signal CRY[n−1], the first and second pull-up transistors T6 and T6C are turned on, and then, when the clock signal CLK is applied during the current horizontal period of the stage STG, the turn-on voltage of the Q node may be boosted by the clock signal CLK to increase in potential.

The fourth transistor T4 may be connected to the Qb node and be switched to charge the Qb node with a turn-on voltage, for example, the high potential power voltage VDD in DC form.

In this regard, for example, a gate electrode and a drain electrode of the fourth transistor T4 may be connected to each other and may be applied with the high potential power supply voltage VDD. A source electrode of the fourth transistor T4 may be connected to the Qb node.

The fourth transistor T4 connected in this way may be continuously maintained in turn-on state by the continuously applied high potential DC power voltage VDD. However, as described later, the Qb node may be connected to the fifth transistor T5 which is controlled by the voltage of the Q node and be controlled, and as a result, a potential (or turn-on/turn-off level) of the voltage of the Qb node may be substantially opposite to that of the Q node. In other words, during a time when the Q node has the turn-on voltage (i.e., a time when the previous carry signal CRY[n−1] is applied (i.e., a previous horizontal period) and a boosting time (i.e., a current horizontal period)), the Qb node may have a turn-off voltage.

The 1A transistor T1A may be connected to the Qc node and be switched to charge the Qc node with a turn-on voltage.

In this regard, for example, in a manner similar to the first transistor T1, a gate electrode and a drain electrode of the 1A transistor T1A may be connected to each other and be supplied with the carry signal of the previous stage (e.g., CRY[n−1]). A source electrode of the 1A transistor T1A may be connected to the Qc node.

The 1A transistor T1A connected in this way may be turned on during the time when the previous carry signal CRY[n−1] has the turn-on voltage (i.e., the previous horizontal period), so that the turn-on voltage may be applied and charged to the Qc node. More specifically, the voltage applied to the Qc node through the 1A transistor T1A may be charged to the charging capacitor Cc connected to the Qc node.

The 3N transistor T3N and the 3B transistor T3B may be connected in series with each other with the Qc node therebetween, and may be connected to the Q node in this series connection state and be switched to discharge (or reset) the voltage charged in the Q node.

In this regard, for example, a gate electrode of the 3N transistor T3N may receive the carry signal CRY[n+1] of the next stage. A drain electrode of the 3N transistor T3N may be connected to the Q node. A source electrode of the 3N transistor T3N may be connected to the Qc node.

Meanwhile, in a manner similar to the 3N transistor T3N, a gate electrode of the 3B transistor T3B may receive the carry signal CRY[n+1] of the next stage. A drain electrode of the 3B transistor T3B may be connected to the Qc node. A source electrode of the 3B transistor T3B may receive the low potential power voltage VSS.

The 3N transistor T3N and 3B transistor T3B configured above may be connected between the Q node and a line that transmits the low potential power voltage VSS, so that the 3N transistor T3N and the 3B transistor T3B may discharge the Q node during the horizontal period of the next stage (or the next horizontal period) to change (or reset) the Q node voltage to the low potential power voltage VSS.

Moreover, during the reset operation time of these 3N and 3B transistors T3N and T3B, the Qc node may be connected to the discharge path of the Q node and be discharged, so that the voltage of the Qc node may also be changed to the low potential power voltage VSS.

The 3*a* transistor T3*a* and the 3*b* transistor T3*b* may be connected in series with each other with the Qc node therebetween, and may be connected to the Q node in this series connection state and be switched to discharge (or reset) the voltage charged in the Q node. The 3*a* and 3*b* transistors T3*a* and T3*b* may have a substantially parallel connection with the 3N and 3B transistors T3N and T3B.

In this regard, for example, a gate electrode of the 3*a* transistor T3*a* may be connected to the Qb node. A drain electrode of the 3*a* transistor T3*a* may be connected to the Q node. A source electrode of the 3*a* transistor T3*a* may be connected to the Qc node.

Meanwhile, a gate electrode of the 3*b* transistor T3*b* may be connected to the Qb node, similar to the 3*a* transistor T3*a*. A drain electrode of the 3*b* transistor T3*b* may be connected to the Qc node. A source electrode of the 3*b* transistor T3*b* may receive the low potential power voltage VSS.

The 3*a* transistor T3*a* and the 3*b* transistor T3*b* configured as above may be connected between the Q node and the line transmitting the low potential power voltage VSS, so that when the Qb node voltage is changed (or reset) to the high potential power voltage VDD, the 3*a* and 3*b* transistors T3*a* and T3*b* may be turned on and discharge the Q node to change (or reset) the Q node voltage to the low potential power supply voltage VSS.

Meanwhile, the voltage of the Qb node may be changed to the high potential power supply voltage (VDD) after an end of the horizontal period of the stage STG (i.e., the current horizontal period (or n-th horizontal period)), and this voltage VDD may remain until the horizontal period of the next frame. Accordingly, it can be said that the 3*a* and 3*b* transistors T3*a* and T3*b* continuously discharge (or reset) the Q node until the horizontal period of the next frame.

During the reset operation time of the 3*a* and 3*b* transistors T3*a* and T3*b*, the Qc node may be connected to the discharge path of the Q node and be discharged, so that the voltage of the Qc node may also be changed to the low potential power voltage VSS.

As above, the voltage of the Q node can be effectively discharged through the T3 series transistors T3*a*, T3*b*, T3N, and T3B connected to the Q node.

Meanwhile, each of the above-described T3 series transistors T3*a*, T3*b*, T3N, and T3B may be formed, for example, in the double-length structure as shown in FIG. 5A or in the single-length structure as shown in FIG. 5B.

In this regard, as shown in FIG. 5A, each of the T3 series transistors T3*a*, T3*b*, T3N, and T3B of the double-length structure may have a channel of a semiconductor layer divided into two and be configured with two transistors connected in series to each other. Accordingly, since a source-drain voltage applied to each of the T3 series transistors T3*a*, T3*b*, T3N, and T3B of the double-length structure is divided and applied to the two divided transistors forming the double-length structure, a source-drain voltage stress for each transistor can be alleviated, and as a result, the T3 series transistors T3*a*, T3*b*, T3N, and T3B of the double-length structure can have robust characteristics against HVDS.

Alternatively, as shown in FIG. 5B, each of the T3 series transistors T3*a*, T3*b*, T3N, and T3B of the single-length structure may have a single channel in a semiconductor layer and be configured with a single transistor. Since the single-length structure is a single transistor structure, it has advantage of reducing an area occupied by the T3 series transistors T3*a*, T3*b*, T3N, and T3B compared to the double-length structure.

Moreover, in this embodiment, the T3 series transistors T3*a*, T3*b*, T3N, and T3B may be separated with the Qc node therebetween to implement a structure that separates the discharge path of the voltage of the Q node. Thus, the voltage of the Q node can be separated and act on each of the T3 series transistors T3*a*, T3*b*, T3N, and T3B, so that a magnitude of a source-drain voltage applied to each of the T3 series transistors T3*a*, T3*b*, T3N, and T3B can be significantly reduced. Accordingly, each of the T3 series transistors T3*a*, T3*b*, T3N, and T3B can be implemented in the single-length structure, and in this case, the area occupied by the T3 series transistors is reduced, allowing a narrow bezel to be effectively realized.

The fifth transistor T5 may be connected to the Qb node, and may be controlled by the voltage of the Q node and be switched to charge and discharge the voltage to the Qb node.

In this regard, for example, a gate electrode of the fifth transistor T5 may be connected to the Q node. A drain electrode of the fifth transistor T5 may be connected to the Qb node. A source electrode of the fifth transistor T5 may receive the low potential power voltage VSS.

The fifth transistor T5 configured in this way may be connected between the Qb node and the line transmitting the low potential power voltage VSS, so that during the time when the Q node has a turn-on voltage (i.e., the previous horizontal period and the current horizontal period), the fifth transistor T5 may be turned on, and the Qb node may be charged with the low potential power voltage VSS which is the turn-off voltage. Then, during a time when the Q node is reset and has a turn-off voltage (i.e., a time after the end of the current horizontal period), the fifth transistor T5 may be turned off, and the voltage of the Qb node may be discharged and be changed (or reset) to the high potential power voltage VDD which is the turn-on voltage.

The charging capacitor Cc may be connected between the Qc node and the line transmitting the low potential power voltage VSS. In other words, one electrode (or first electrode) of the charging capacitor Cc may be connected to the Qc node, and the other electrode (or second electrode) of the charging capacitor Cc may be applied with the low potential power voltage VSS.

In this way, the charging capacitor Cc may be connected to the Qc node which is a contact point between two T3 series transistors connected in series that form the discharge path of the Q node.

In this regard, the charging capacitor Cc may be connected to the Qc node, which is the contact point between the 3*a* and 3*b* transistors T3*a* and T3*b* in a series connection, and similarly, be connected to the Qc node which is the contact point between the 3N and 3B transistors T3N and T3B in a series connection.

As such, by connecting the charging capacitor Cc between the two T3 series transistors (T3*a* and T3*b*, T3N and T3B) that form the discharge path of the Q node, HVDS of the T3 series transistors T3*a*, T3*b*, T3N, and T3B can effectively improved, and drop in voltage of the Q node voltage can be effectively improve when the threshold voltage is shifted negatively.

In this regard, for example, as mentioned above, the 3*a* and 3*b* transistors T3*a* and T3*b*, which are the series-connected T3 series transistors located on the discharge path of the Q node, may be connected to the charging capacitor Cc at the Qc node which is the contact point between the 3*a* and 3*b* transistors T3*a* and T3*b*.

In other words, in the discharge path of the Q node, the T3 series transistors may be separated into two with the Qc node therebetween, and the charging capacitor (Cc) may be connected to the Qc node which is the separation point.

In some embodiments, as shown in FIGS. 5A and 5B, the Qc node is coupled to the power supply source (e.g., VSS) via the charging capacitor Cc.

Accordingly, the voltage of the Q node can separately act on (or be separately applied to) the 3*a* and 3*b* transistors T3*a* and T3*b*, so that a magnitude of a source-drain voltage acting on each of the 3*a* and 3*b* transistors T3*a* and T3*b* can be reduced.

Therefore, the source-drain voltage stress on the T3 series transistor connected to the Q node is significantly reduced, and the HVDS can be improved.

Figure 6:
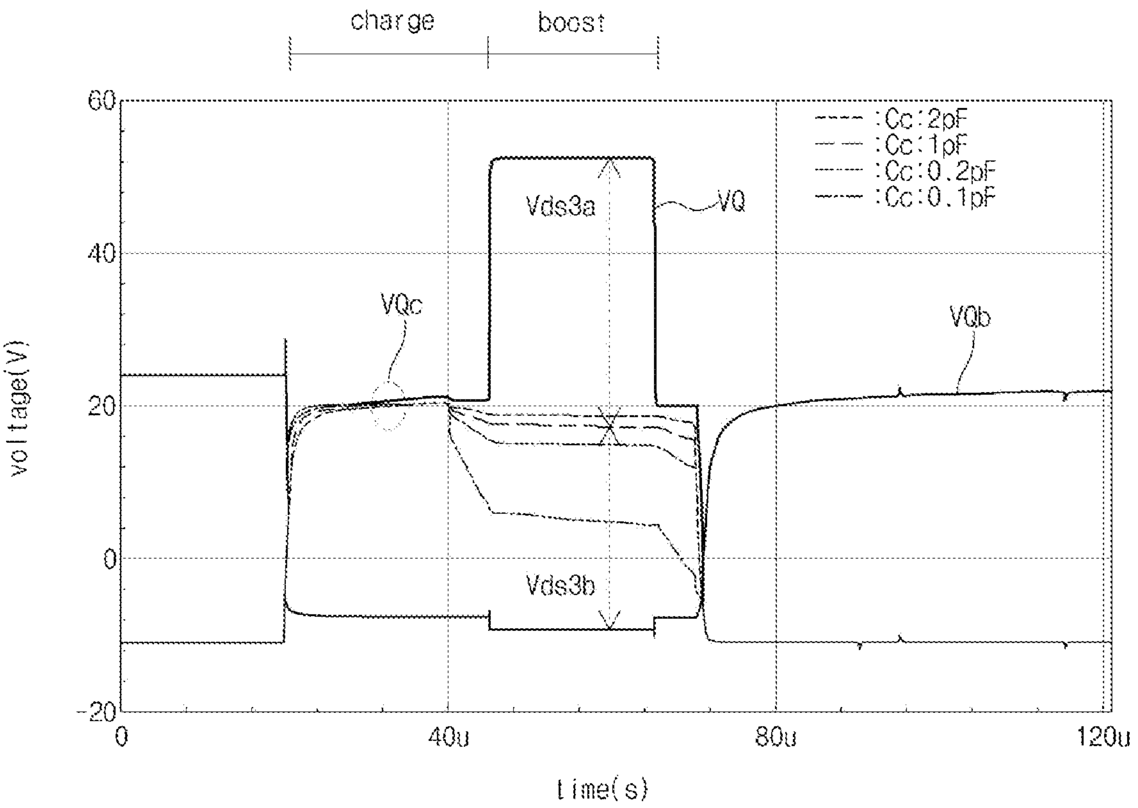
FIG. 6 is a view illustrating a result of measuring voltages of Q node and Qc node according to capacitances of a charging capacitor as a result a driving experiment of a gate driving circuit according to an embodiment of the present disclosure.

FIG. 6 may be referred to for the HVDS improvement effect. FIG. 6 is a view illustrating a result of measuring voltages of Q node and Qc node according to capacitances of a charging capacitor as a result a driving experiment of a gate driving circuit according to an embodiment of the present disclosure.

In the driving experiment of FIG. 6, Q node voltages VQ and Qc node voltages VQc are measured when the charging capacitor Cc has capacitances of 0.1 pF, 0.2 pF, 1 pF, and 2 pF. Meanwhile, in FIG. 6, VQb represents a Qb node voltage.

Referring to FIG. 6, regarding the Q node voltage VQ, a voltage is charged to the Q node during a charge section (or set section) which is the previous horizontal period, and during a boost section, when a clock signal CLK is applied, as the current horizontal period, a voltage is boosted and becomes higher.

Regarding the voltage VQc of the Qc node to which the charging capacitor Cc is connected, a voltage substantially equal to the Q node voltage VQ is charged to the Qc node during the charge section, and a voltage may be partially reduced depending on the capacitance during the boost section.

In this regard, as the capacitance increases, a charging amount of the charging capacitor Cc increases. Thus, as the capacitance of the charging capacitor Cc increases, the Qc node voltage VQc in the boost section may become saturated with a decrease amount of voltage (i.e., a decrease amount based on the voltage in the charge section) becoming smaller.

As such, by using the charging capacitor Cc connected to the Qc node, the Q node voltage VQ can be separated across the Qc node voltage VQc and applied to the 3*a* and 3*b* transistors T3*a* and T3*b*. In other words, the voltage of VQ-VQc acts as the source-drain voltage Vds3*a* of the 3*a* transistor T3*a*, and the voltage of VQc-VSS acts as the source-drain voltage Vds3*b* of the 3*b* transistor T3*b*. Meanwhile, in FIG. 3, for convenience of explanation, the Vds3*a* and Vds3*b* are shown when the capacitance is 1 pF.

Through the structure of separating the discharge path of the Q node, the magnitude of each of the source-drain voltages Vds3*a* and Vds3*b* applied to each of the 3*a* and 3*b* transistor T3*a* and T3*b* as the T3 series transistors can be significantly reduced, and thus the HVDS can be improved.

This HVDS improvement effect can be equally exhibited for the 3N and 3B transistors T3N and T3B as the T3 series transistors.

Meanwhile, according to the experimental result of FIG. 6, the charging capacitor Cc of this embodiment may be formed to have the capacitance of approximately 0.1 pF to 2 pF, but not limited thereto.

Meanwhile, as shown in FIG. 6, when the capacitance is 1 pF or more, an amount of change in the Qc node voltage VQc according to an increase in capacitance becomes very small, so that an effect of reducing the source-drain voltage Vds is minimal. Rather, the increase in capacitance results in increase in area of the charging capacitor Cc.

Taking this into account, in order to maximize the effect of reducing the source-drain voltage relative to the area of the charging capacitor Cc, the charging capacitor Cc may be configured to have the capacitance of approximately 0.1 pF to 1 pF.

Moreover, as described above, the source-drain voltages of the T3 series transistors is reduced to improve the HVDS, so that the T3 series transistors can be configured in the single-length structure as shown in FIG. 5B. Accordingly, the area of the T3 series transistors is reduced, and as a result, a narrow bezel of the display apparatus can be effectively implemented.

Meanwhile, regarding improving the voltage drop of the Q node when the threshold voltage of the T3 series transistor is negatively shifted, as mentioned above, in this embodiment, the discharge path of the Q node is separated through the Qc node and the charging capacitor Cc is connected to the Qc node.

Accordingly, even if the threshold voltage of the T3 series transistor is shifted negatively, due to the Qb node voltage, the 3*a* and 3N transistors T3*a* and T3N which are the T3 series transistors directly connected to the Q node (and the 3*b* and 3B transistors T3*b* and T3B which are the T3 series transistors connected to the low potential power voltage VSS) can be maintained in turned-off state, so that the voltage of the Q node can be sufficiently maintained.

Therefore, when the threshold voltage is negatively shifted, the voltage drop of the Q node can be effectively relieved.

Figure 7A:
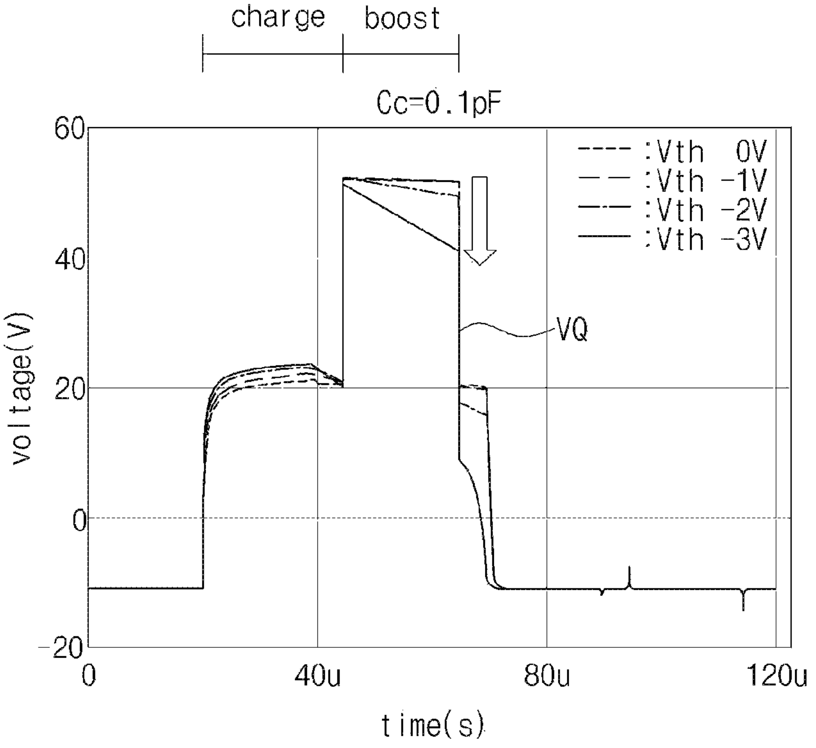
FIGS. 7A and 7B are views illustrating a result of measuring voltages of a Q node according to threshold voltages as a result of a driving experiment of a gate driving circuit according to an embodiment of the present disclosure.
Figure 7B:
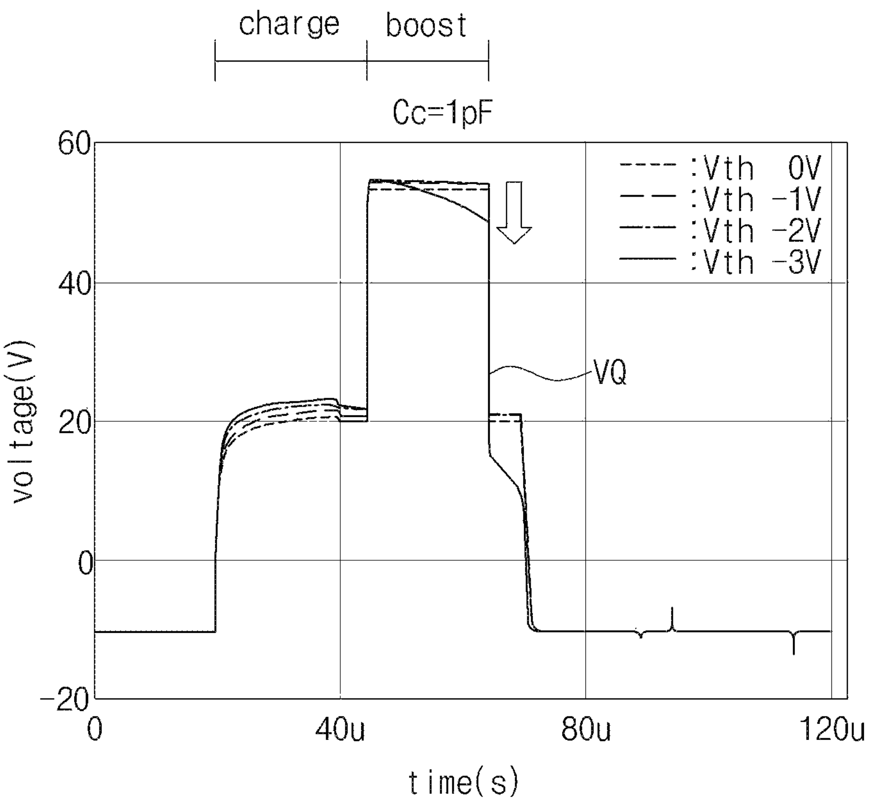

FIGS. 7A and 7B may be referred to for the effect of improving the voltage drop of the Q node. FIGS. 7A and 7B are views illustrating a result of measuring voltages of a Q node according to threshold voltages as a result of a driving experiment of a gate driving circuit according to an embodiment of the present disclosure.

In the driving experiment of FIGS. 7A and 7B, the Q node voltages VQ are measured when the threshold voltages are 0V, −1V, −2V, and −3V. In addition, FIG. 7A shows a result of an experiment measuring the Q node voltages according to the negative shift of threshold voltage when using the charging capacitor Cc with a capacitance of 0.1 pF, and FIG. 7B shows a result of an experiment measuring the Q node voltages according to the negative shift of threshold voltage when using the charging capacitor Cc with a capacitance of 1 pF.

Referring to FIGS. 7A and 7B, in the charge section of the Q node, even if the threshold voltage is negatively shifted to −1V, −2V, and −3V, compared to a case of a threshold voltage of 0V without shift, there is practically no significant difference in the Q node voltage VQ.

In addition, in the boost section of the Q node, even if the threshold voltage is changed negatively to −1V or −2V, compared to a case of a threshold voltage of 0V without shift, a decrease amount of the Q node voltage VQ is very small, so that a control operation of the Q node can be performed normally. Meanwhile, when the negative shift change is very large as −3V, a decrease amount of the Q node voltage VQ increases, and in this case, it is somewhat difficult to perform a control operation of the Q node normally.

Meanwhile, comparing FIGS. 7A and 7B, as the capacitance of the charging capacitor Cc increases, a holding power of the Q node voltage VQ improves.

As such, due to the structure of separating the discharge path of the Q node, even if the threshold voltage of the T3 series transistor is negatively shifted, the Q node voltage VQ can be maintained stably, so that when the threshold voltage is negatively shifted, the voltage drop of the Q node can be improved.

As described above, according to the embodiment of the present disclosure, the Qc node is installed for the T3 series transistors located in the discharge path of the Q node, the T3 series transistors are separated based on the Qc node, and the charging capacitor is connected to the Qc node. Thus, the structure separating the discharge path of the Q node can be implemented.

Accordingly, the magnitude of the source-drain voltage applied to the separated T3 series transistors can be significantly reduced, so that the HVDS can be improved. In addition, with improvements of the HVDS, the T3 series transistors can be formed in the single-length structure, thereby effectively implementing a narrow bezel.

In addition, even if the threshold voltage of the T3 series transistors is negatively shifted due to deviation in process, etc., the Q node voltage can be maintained stably, so that the voltage drop of the Q node due to the negative shift of the threshold voltage can be improved.

It will be apparent to those skilled in the art that various modifications and variation can be made in the present disclosure without departing from the spirit or scope of the disclosure. Thus, it is intended that the present disclosure cover the modifications and variations of this disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A display apparatus, comprising:

a display panel including a pixel and a gate line electrically connected to the pixel; and a gate driving circuit including a stage that outputs a gate signal to the gate line, wherein the stage includes:

a first pull-up transistor and a first pull-down transistor that are electrically connected to each other at a first output terminal, which outputs the gate signal, therebetween;

a first node and a second node that are respectively electrically connected to the first pull-up transistor and the first pull-down transistor;

a first transistor and a second transistor which are located in a discharge path of the first node and are electrically connected in series with each other at a third node therebetween, and whose gate electrodes are electrically connected to the second node; and a charging capacitor having a first electrode electrically connected to the third node.

2. The display apparatus of claim 1, wherein the stage further includes a third transistor and a fourth transistor which are located in the discharge path of the first node and are electrically connected in series with each other with the third node therebetween, and whose gate electrodes receive a carry signal output from a next stage.

3. The display apparatus of claim 1, wherein the stage further includes:

a fifth transistor whose source electrode is electrically connected to the first node, and whose gate electrode and drain electrode receive a carry signal output from a previous stage; and a sixth transistor whose source electrode is electrically connected to the third node, and whose gate electrode and drain electrode receive the carry signal output from the previous stage.

4. The display apparatus of claim 1, wherein the stage further includes a seventh transistor whose source electrode is electrically connected to the second node, and whose gate electrode and drain electrode receive a first power voltage.

5. The display apparatus of claim 1, wherein the stage further includes a eighth transistor whose drain electrode is electrically connected to the second node, whose gate electrode is electrically connected to the first node, and whose source electrode receives a second power voltage.

6. The display apparatus of claim 1, wherein the stage further includes a second pull-up transistor and a second pull-down transistor that are electrically connected to each other with a second output terminal, which outputs a carry signal, therebetween, and that are respectively electrically connected to the first node and the second node, and wherein the carry signal of the stage is provided to a previous stage and a next stage.

7. The display apparatus of claim 1, wherein a capacitance of the charging capacitor is 0.1 pF to 1 pF.

8. A display apparatus, comprising:

a display panel including a scan line; and a stage that outputs a scan signal to the scan line, wherein the stage includes:

a first pull-up transistor and a first pull-down transistor that output the scan signal;

a first node and a second node that are respectively electrically connected to the first pull-up transistor and the first pull-down transistor;

a first transistor and a second transistor which are electrically connected in series with each other with a third node therebetween, and whose gate electrodes are electrically connected to the second node; and a charging capacitor having an electrode electrically connected to the third node, wherein a drain electrode of the first transistor is electrically connected to the first node, and a source electrode of the second transistor receives a second power voltage.

9. The display apparatus of claim 8, where the stage further includes a third transistor and a fourth transistor which are electrically connected in series with each other with the third node therebetween, and whose gate electrodes receive a carry signal output from a next stage, and wherein a drain electrode of the third transistor is electrically connected to the first node, and a source electrode of the fourth transistor receives the second power voltage.

10. The display apparatus of claim 8, wherein the stage further includes:

a fifth transistor whose source electrode is electrically connected to the first node, and whose gate electrode and drain electrode receive a carry signal output from a previous stage; and a sixth transistor whose source electrode is electrically connected to the third node, and whose gate electrode and drain electrode receive the carry signal output from the previous stage.

11. The display apparatus of claim 8, wherein the stage further includes a seventh transistor whose source electrode is electrically connected to the second node, and whose gate electrode and drain electrode receive a first power voltage.

12. The display apparatus of claim 8, wherein the stage further includes an eighth transistor whose drain electrode is electrically connected to the second node, whose gate electrode is electrically connected to the first node, and whose source electrode receives the second power voltage.

13. The display apparatus of claim 8, wherein the stage further includes a second pull-up transistor and a second pull-down transistor that are respectively electrically connected to the first node and the second node, and output a carry signal, wherein the carry signal of the stage is provided to a previous stage and a next stage.

14. The display apparatus of claim 8, wherein a capacitance of the charging capacitor is 0.1 pF to 1 pF.

15. A display apparatus, comprising:

a display panel including a first pixel, and a first gate line coupled to the first pixel;

a gate driving circuit including a previous stage, a stage, and a subsequent stage, the stage of the gate driving circuit configured to output a first gate signal to the first gate line, wherein the previous stage precedes the stage, and the subsequent stage succeeds the stage, wherein the stage of the gate driving circuit includes:

a first pull-up transistor having a first electrode and a first gate electrode;

a first pull-down transistor having a second electrode and a second gate electrode;

a first output terminal configured to output the first gate signal, the first output terminal between the first electrode of the first pull-up transistor and the second electrode of the first pull-down transistor;

a first transistor coupled to the first gate electrode of the first pull-up transistor;

a third transistor coupled to the first gate electrode of the first pull-up transistor and coupled in parallel with the first transistor;

a third node coupled to the first transistor and the third transistor; and a charging capacitor coupled to the third node, wherein respective drain electrode of the first and third transistors is coupled to the first gate electrode of the first pull-up transistor, and respective source electrode of the first and third transistors is coupled to the third node.

16. The display apparatus of claim 15, wherein the third node is coupled to a power supply source via the charging capacitor.

17. The display apparatus of claim 15, wherein the stage of the gate driving circuit includes: a second transistor coupled in series with the first transistor, the third node between the first transistor and the second transistor.

18. The display apparatus of claim 17, wherein respective gate electrode of the first and second transistors is coupled to the second gate electrode of the first pull-down transistor.

19. The display apparatus of claim 18, wherein the stage of the gate driving circuit includes: a fourth transistor coupled in series with the third transistor, the third node between the third transistor and the fourth transistor.

20. The display apparatus of claim 19, wherein respective gate electrode of the third and fourth transistors receives a carry signal output of the subsequent stage.

* * * * *